United States Patent

[11] 3,595,328

[72] Inventor Paul D. Griem, Jr.
    Newark, Ohio
[21] Appl. No. 855,951
[22] Filed Sept. 8, 1969
[45] Patented July 27, 1971
[73] Assignee Owens-Corning Fiberglas Corporation

[54] AUTOMATIC BATCH WEIGHING SYSTEM
    10 Claims, 2 Drawing Figs.
[52] U.S. Cl. .................................................. 177/1,
                                                        177/70
[51] Int. Cl. ............................................ G01g 19/22
[50] Field of Search ................................ 177/1, 70,
                                                    210, 211

[56] References Cited
    UNITED STATES PATENTS
| 2,587,531 | 2/1952 | Saxe | 177/70 UX |
| 2,712,203 | 7/1955 | Green | 177/70 X |
| 2,780,456 | 2/1957 | Berwaerts | 177/70 X |
| 3,106,974 | 10/1963 | Williams, Jr. | 177/70 |
| 3,156,312 | 11/1964 | Heltzel et al. | 177/70 |
| 3,167,139 | 1/1965 | Schellentrager | 177/70 |
| 3,203,591 | 8/1965 | Daulton et al. | 177/70 X |
| 3,362,490 | 1/1968 | Maxwell | 177/70 |
| 3,477,529 | 11/1969 | Burn et al. | 177/70 X |

Primary Examiner—Richard B. Wilkinson
Assistant Examiner—George H. Miller, Jr.
Attorneys—Staelin & Overman and Oliver E. Todd, Jr.

ABSTRACT: An automatic batch weighing system for compounding a series of batches containing predetermined measured quantities of various constituents. The constituents for each batch are successively fed into a batch receiving hopper. The compounded constituents are thereafter mixed in a mixing hopper and delivered to a selected utilizing means. The feeding of each constituent is adjusted by estimating the weight of an unpredictable dribble and by compensating for any deviation in the most recent batch compounded for the selected utilizing means, to average out errors in the series of batches.

AUTOMATIC BATCH WEIGHING SYSTEM

BACKGROUND OF THE INVENTION

This invention relates to a weighing system and more particularly to an improved method for sequentially compounding predetermined quantities of a plurality of constituents to form a batch and wherein errors in successive batches are compensated for.

Typically, batch weighing systems operate on one of two general principles. In one system, the various batch constituents are individually weighed prior to compounding in a batch receiving hopper. Either a separate scale is used for each constituent or the constituents are individually and sequentially weighed on a single scale and individually dumped into the batch receiving hopper. The cost of having a separate scale for each constituent may be prohibitively high and the final batch may be inaccurate due to variations between the scales. In either case, the final batch is also subject to inaccuracies occurring from the apparatus used for feeding the various constituents to the scale.

In the second type of batch weighing system, the various batch constituents are sequentially accumulated in a batch receiving hopper which is mounted either on a fulcrumed weight beam or on a strain gauge for determining the weight of the hopper and its contents. The system may be controlled in response to either the total weight of the batch constituents accumulated in the hopper or to the weight increment as each constituent is sequentially fed into the hopper. If the total weight is used to control the system and if, for example, 40 pounds of a first batch constituent and 10 pounds of a second batch constituent are desired, then control points are set at 40 pounds for the first constituent and at 40 plus 10 or 50 pounds for the second constituent. Thus, the feeding of the first constituent will be stopped when the scale senses a weight of 40 pounds and the feeding of the second constituent will be stopped when the scale senses a weight of 50 pounds. This type of control system is undesirable, however, because weight errors are cumulative. If 42 pounds of the first constituent are actually fed into the hopper instead of the desired 40 pounds, due to variations in the feeding operation, then only 8 pounds of the second constituent will be fed, resulting in nearly a 24 percent error in the constituent proportions. If on the other hand the system is controlled by using only the weight increment of each successive constituent, cumulative errors are eliminated.

Measurement errors usually occur in the prior art batch weighing systems due to variations in the constituent feeding equipment. If, for example, the batch constituents are fed into a batch receiving hopper by individual feed screws for each constituent, errors may occur for each constituent due to the position of the feed screw when it is stopped, due to the wear of the feed screw, and due to particle size, packing and moisture content of the constituent. Furthermore, the feed screws are typically mounted some distance above the batch receiving hopper. When a feed screw is stopped, there will be some material falling from the feed screw into the hopper which will cause measurement errors. Attempts to eliminate measurement errors occurring in the above systems have met with varying degrees of success.

SUMMARY OF THE INVENTION

According to the instant invention, successive batches composed of predetermined measured weights of various constituents are compounded in a batch receiving hopper by sequentially accumulating the constituents in the hopper. Each constituent is accumulated first at a fast feed rate and, when less than a predetermined slow feed rate remains to be fed, at a slow feed rate. Prior to feeding each constituent into the hopper, a scale tare is determined by weighing the hopper and all constituent is fed into the batch receiving hopper, the weight of the hopper and the constituents therein is compared to a high preset weight and a low preset weight which are determined by a batch controller. The high preset weight comprises the scale tare plus the predetermined measured weight for the constituent being fed less an estimated unpredictable dribble weight for the constituent being fed and less error weight determined for the constituent being fed. The low preset comprises the high preset less a predetermined slow feed weight.

When the total weight of the batch receiving hopper and the constituents therein is less than the low preset weight, a selected constituent is fed into the batch receiving hopper at a fast rate. When the total weight of the batch receiving hopper and the constituents therein exceeds the low preset weight but is less than the high preset weight, the selected constituent is fed at a slow rate. Feeding is stopped when the total weight of the batch receiving hopper and the constituents therein reaches the high preset weight. Although feeding is stopped, and unpredictable dribble quantity of the selected constituent will fall into the hopper. The dribble quantity results from the final position and condition of the feeding apparatus, the condition of the selected constituent and the quantity of the constituent falling from the feeding apparatus into the hopper at the time feeding is stopped. If the actual dribble weight deviates from the estimated dribble weight for the selected constituent, a new estimated unpredictable dribble weight is determined for the next batch and an error weight is determined to compensate for the deviation. After all of the various batch constituents are accumulated in the batch receiving hopper, they are delivered to a mixing hopper and, after mixing, they are delivered to a selected utilizing means.

The above method is particularly suitable for use in the glass industry for successively compounding batches of glass constituents for various glass furnaces wherein each furnace requires a different mixture of the constituents. A separate storage hopper is usually positioned adjacent to each glass furnace for holding a number of batches compounded for the furnace. Each batch of constituents which is sequentially fed into a storage hopper is compensated for measurement errors in the previous batch delivered to the hopper. Since a glass furnace may hold as many as 20 or more batches, the errors are averaged out and the resulting glass will be extremely close to its desired formula. The various batch formulas for the various furnaces are stored in a batch controller which selects the furnace for which the batch is compounded and controls the feeding of the various batch constituents into the batch receiving hopper.

It is the primary object of this invention to provide an improved method for the separate compounding of a series of individual batches containing predetermined measured weights of various constituents, each of which batches is to be delivered to a selected utilizing means.

Other objects and advantages will become apparent from the following detailed description, reference being made to the accompanying drawings.

DESCRIPTION OF THE PREFERRED EMBODIMENT

Figure 1:
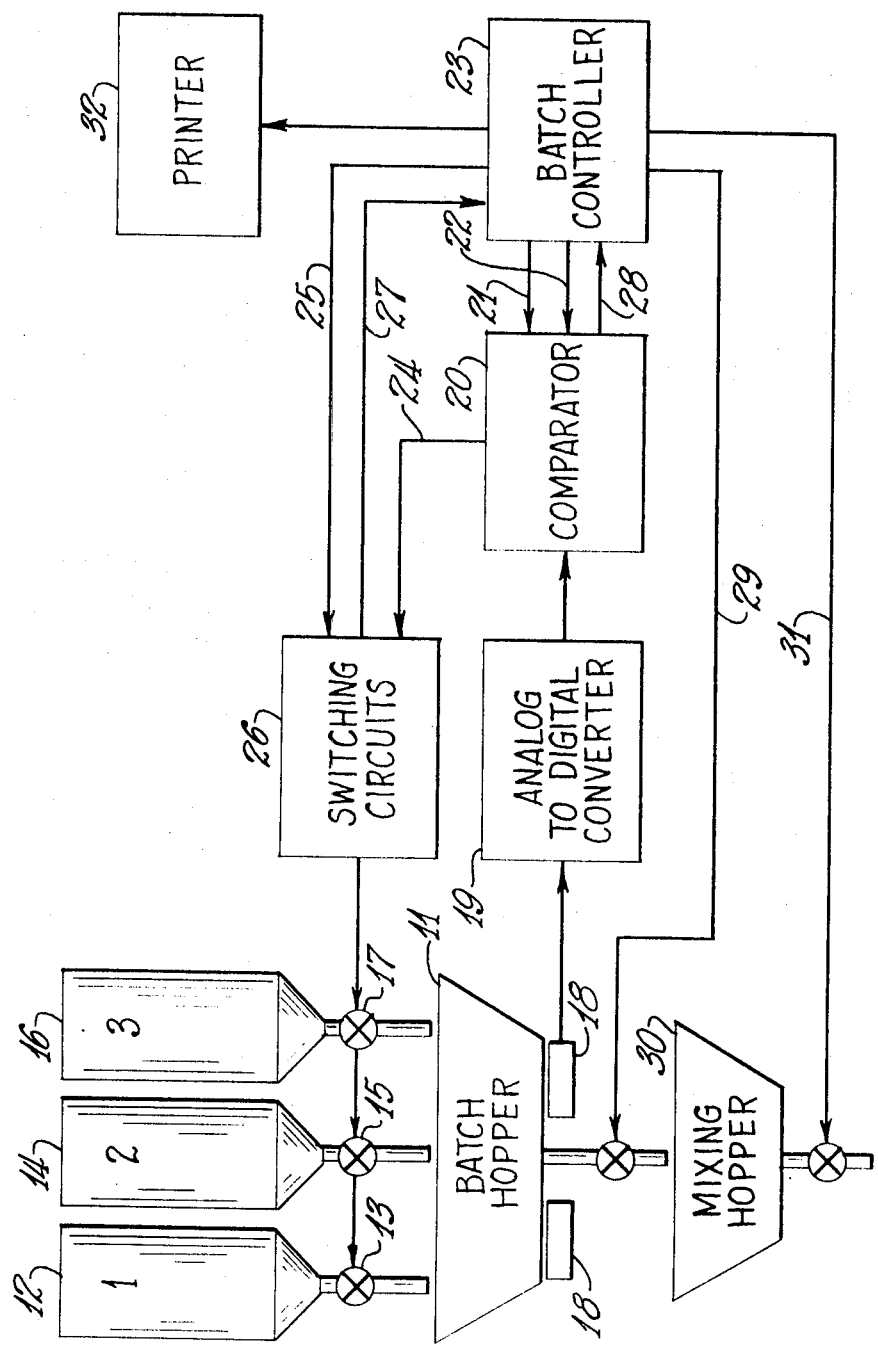
FIG. 1 is a schematic block diagram of a batch weighing system incorporating the instant invention.

Referring now to FIG. 1, a block diagram is shown of a weighing system incorporating the instant invention. The various batch constituents are fed from storage hoppers or other suitable sources into a batch receiving hopper 11. A first constituent storage hopper 12 having a feed control means 13, a second constituent storage hopper 14 having a feed control means 15 and a third constituent storage hopper 16 having a feed control means 17 are shown, although any number of storage hoppers may be connected for discharging into the batch receiving hopper 11. The constituent feed control means 13, 15 and 17 may, for example, comprise a valve, a feed screw, or a conveyor.

The batch receiving hopper 11 is shown mounted on a pair of strain gauges 18 which are serially connected to have an analogue output voltage proportional to the total weight of the batch receiving hopper 11 and the constituents accumulated therein. The analogue output voltage of the strain gauge 18 is connected to the input of an analogue-to-digital converter 19 which has a binary coded decimal (B.C.D.) output corresponding to the total weight of the batch receiving hopper 11 and the constituents accumulated therein. The B.C.D. output of the converter 19 is applied to one input of a conventional comparator 20. The comparator 20 compares the digital output of the converter 19 with a high preset output 21 and a low preset output 22 from a batch controller 23. The high preset output 21 and the low preset output 22 are each in the form of a B.C.D., similar to the B.C.D. output of the converter 19. An output 24 of the comparator 20, as well as an output 25 from the batch controller 23 are applied to switching circuits 26 for controlling the constituent feed control means 13, 15 and 17. Signals applied on the output 25 of the batch controller 23 control the switching circuit 26 to select the constituent to be fed and to initiate the feeding operation. Once the feeding of a constituent is initiated, the feeding will continue at a fast rate so long as the comparator 20 senses that the total weight of the hopper 11 and the constituents accumulated therein, as taken at the output of the converter 19, is less than the low preset 22. As soon as the output of the converter 19 reaches the low preset output 22, the comparator 20 applies a signal to the switching circuits 26 through its output 24 to initiate feeding at a slow rate. The comparator 20 applies a second signal to the switching circuit 26 when the output of the converter 19 matches or exceeds the high preset output 21 of the batch controller 23. The second signal causes the switching circuits 26 to stop the feeding operation.

When the feeding operation is stopped, the switching circuits 26 apply a signal through an output 27 to the batch controller 23. The batch controller 23 then compares the output of the converter 19, which is applied on a line 28 by the comparator 20, with the high preset output 21. If the total weight as indicated on the line 28 differs from the high preset output 21, an error weight and a new dribble weight estimate are determined for use in determining the high preset weight for the same constituent for the next batch compounded for the same utilizing means. The total weight, as applied on the line 28, is also used as a scale tare for determining the high preset value for the next constituent to be fed.

The high preset output 21 of the batch controller 23 is individually determined by the batch controller 23 for each constituent which is sequentially fed into the batch receiving hopper 11. The high preset output 21 comprises the algebraic sum of the scale tare, a predetermined formula quantity for the constituent to be fed, an estimated but unpredictable dribble quantity, and a compensation quantity for weighing errors in the previous batch. The dribble quantity and the compensation quantity will usually have negative values. The estimated dribble quantity is determined for each constituent from the amount of the constituent fed into the batch receiving hopper 11 after the switching circuits 26 stop the feed control means for such constituent. The low preset output 22 of the batch controller 23 is determined by subtracting a desired total slow feed constituent weight from the high preset output 21. It is preferable to determine a slow feed weight for each batch constituent such that the slow feed time is the same for all constituents.

After all the batch constituents are compounded in the batch receiving hopper 11, the batch controller 23 applies a signal on an output line 29, causing the compounded batch to be delivered into a mixing hopper 30. The compounded batch may be mixed in the mixing hopper 30 while the next batch is being compounded in the batch receiving hopper 11. As soon as the compounded batch in the mixing hopper 30 is completely mixed, the batch controller 23 applies a signal on an output line 31 to cause the mixed batch to be conveyed to a selected utilizing means. In some instances, the mixed compounded batch must be conveyed for a sufficient distance that a first batch may be compounded in the batch receiving hopper 11 while a second batch is mixed in the mixing hopper 30 and a third batch is simultaneously being conveyed. A printer 32 may optionally be connected to the batch controller 23 for recording the actual quantities of the various constituents fed into the batch receiving hopper 11 for each successive batch. Deviations in the quantities of each constituent fed into the batch receiving hopper 11, as well as other pertinent information, may also be recorded by the printer 32.

Figure 2:
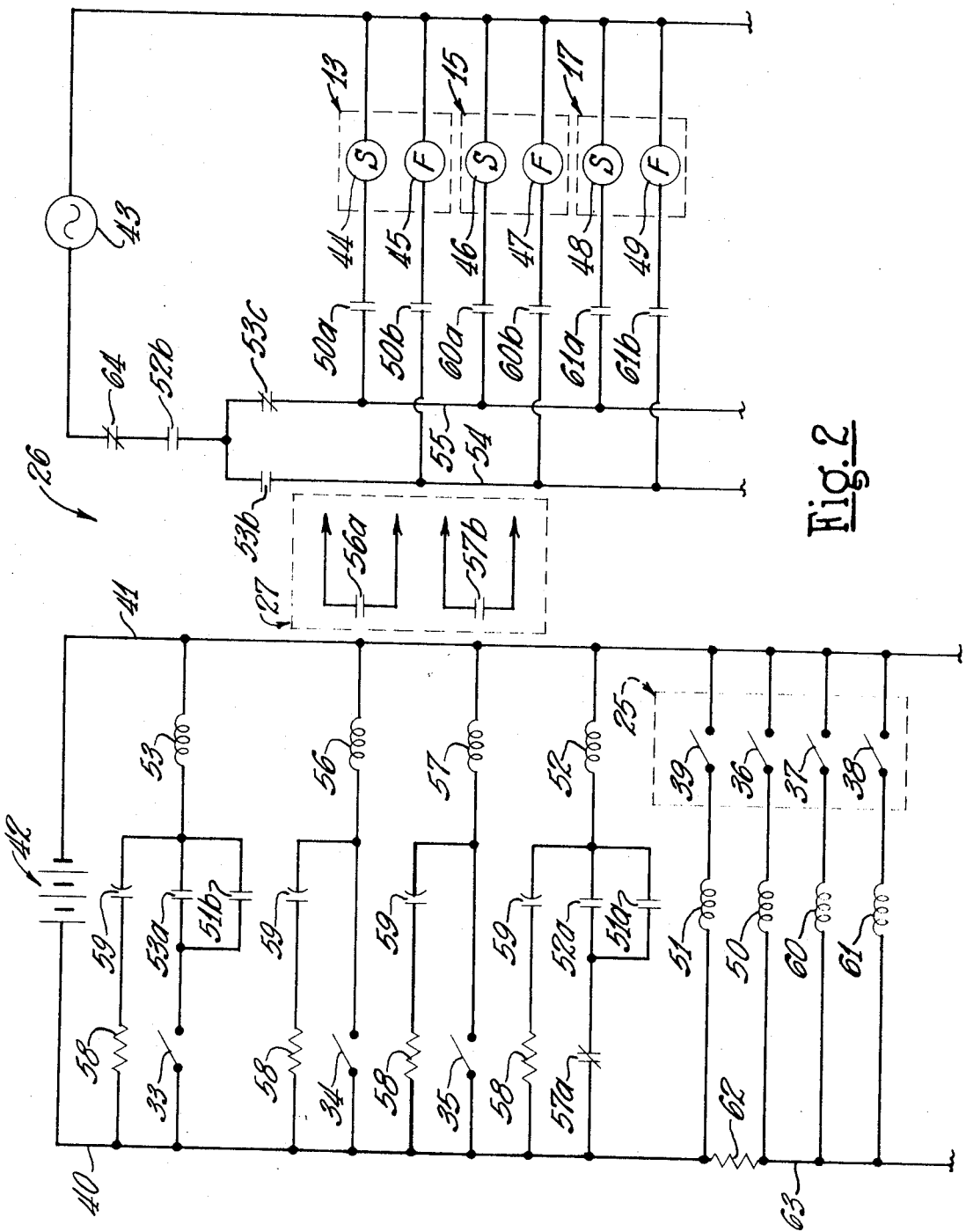
FIG. 2 is a schematic circuit diagram of the switching circuits for controlling the feeding operation for the various batch constituents.

Referring now to FIG. 2, the switching circuits 26 are shown in detail. The comparator 20 will apply one of three outputs to the switching circuits 26 on the output 24. When the output of the converter 19 is less than the low preset output 22 of the batch controller 23, the comparator 20 will close a switch or relay 33. When the output of the converter 19 lies between the low preset output 22 and the high preset output 21 of the batch controller 23, the comparator 20 will close a switch or relay 34. Finally, when the output of the converter 19 is equal to or greater than the high preset output 21 of the batch controller 23, the comparator 20 will close a switch or relay 35.

The batch controller 23 similarly applies a number of signals on the output 25 for controlling the switching circuits 26. Feeding operation of the first constituent from the hopper 12, the second constituent from the hopper 14, or the third constituent from the hopper 16 is selected by the batch controller by closing a first switch or relay 36, a second switch or relay 37, or a third switch or relay 38, respectively. After the constituent is selected, the batch controller 23 will close a switch or relay 39 to initiate feeding of the selected constituent. The various outputs 24 and 25 from the comparator 20 and the batch controller 23 are connected across a positive buss 40 and a negative buss 41 for operating a number of control relays. A voltage is applied between the positive buss 40 and the negative buss 41 by a suitable DC source 42.

The constituent feed control means 13, 15 and 17 are shown as pairs of electric motors operated from a suitable AC power source 43. The first constituent feed control means 13 includes a slow feed motor 44 and a fast feed motor 45, the second constituent feed control means 15 includes a slow feed motor 46 and a fast feed motor 47, and the feed control means 17 for the third constituent 16 includes a slow feed motor 48 and a fast feed motor 49. The slow feed motors 44, 46 and 48 and the fast feed motors 45, 47 and 49 may, for example, operate feed screws or feed conveyors.

If the batch controller 23 selects, for example, the first constituent to be fed, the batch controller 23 closes the switch 36 to energize a first constituent relay coil 50 from the power source 42. When the relay coil 50 is energized, two associated pairs of normally open relay contacts 50a and 50b are shorted. The relay contacts 50a and 50b are connected in series between the first constituent slow feed motor 44 and the first constituent fast feed motor 45, respectively, and the AC power source 43. Since feeding is just being initiated, the output of the converter 19 will be less than the low preset output 22 and the comparator 20 will hold the switch 33 closed. The batch controller 23 initiates the feeding operation by momentarily closing the switch 39 to momentarily energize a relay coil 51. Relay contacts 51a and 51b, which are associated with the relay coil 51, are momentarily shorted. Shorting the relay contacts 51a energizes a relay coil 52, thereby shorting associated pairs of contacts 52a and 52b. The relay contacts 52a are connected in parallel with the relay contacts 51a and in series with the relay coil 52 to hold the relay coil 52 in an energized condition once energized by the contacts 51a. Similarly, since the switch 33 is closed by the comparator 20, the momentary closure of contacts 51b will energize the relay coil 53 and associated relay contacts 53a, which are in parallel with the contacts 51b, hold the relay coil 53 in an energized state.

The relay 53 also has associated normally open contacts 53b and normally closed contacts 53c for selectively applying power from the AC source 43 to a fast feed buss 54 and a slow feed buss 55 to selectively actuate the fast constituent feed motors 45, 47 and 49 or the slow constituent feed motors 44, 46 and 48. Since the relays 52 and 53 are energized, the relay contacts 52b and 53b will be closed to apply voltage from the source 43 to the fast feed buss 54. Also, since the batch controller 23 has selected the first constituent by closing the switch 36, the relay contacts 50b are shorted and the first constituent fast feed motor 45 is energized.

The system will remain in the fast feed state until the comparator 20 indicates that the output of the converter 19 has reached the low preset output 22 by opening the switch 33 and closing the switch 34. When the switch 33 is open, the relay coil 53 will become unenergized and the associated contacts 53b will open and the contacts 53c will close to apply voltage from the AC source 43 to the slow feed buss 55. The first constituent fast feed motor 45 will then become unenergized, and, since the relay contacts 50a are shorted, the first constituent slow feed motor 44 will become energized from the slow feed buss 55. Since the comparator 20 closed the switch 34, a relay coil 56 will become energized to short a pair of associated contacts 56a, confirming to the batch controller 23 that slow feed has been started.

Slow feed will continue until the output of the digital converter 19 reaches the high preset output 21 of the batch controller 23, whereupon the comparator 20 will open the switch 34 and simultaneously close the switch 35. Closing the switch 35 will energize a relay coil 57 to open a pair of normally closed contacts 57a which are in series with the energized relay coil 52. The relay coil 52 will then be deenergized, opening the associated contacts 52b to remove the voltage from the slow feed buss 55. The energized relay 57 also has a pair of contacts 57b which are closed to indicate to the batch controller 23 that the first constituent feeding has been completed.

The switches and relay contacts which operate the relay coils 52, 53, 56 and 57, are each protected from arcing by a series connected resistor 58 and capacitor 59. After the feeding and weighing of the first constituent has been completed, the batch controller 23 will open the switch 36 and will then select the second constituent by closing the switch 37 to energize a relay coil 60. The relay coil 60 has an associated pair of normally open contacts 60a which are connected in series between the second constituent slow feed motor 46 and the slow feed buss 55 and a pair of normally open contacts 60b which are connected in series between the second constituent fast feed motor 47 and the fast feed buss 54. Similarly, when the feeding and weighing operation for the second constituent 14 is completed, the batch controller 23 will open the switch 37 and initiate feeding of the third constituent by closing the switch 38 to energize a relay coil 61. The relay coil 61 has associated pairs of normally open contacts 61a and 61b which are connected, respectively, between the slow feed buss 55 and the third constituent slow feed motor 48 and the fast feed buss 54 and the third constituent fast feed motor 49.

A resistor 62 is placed in series between the DC power source 42 and a power buss 63 for the constituent feed control relay coils 50, 60 and 61 to prevent accidental feeding of more than one constituent at a time. When one of the coils 50, 60 and 61 is energized by the batch controller 23 closing one of the switches 36, 37 and 38, respectively, the voltage appearing between the buss 63 and the buss 41 will be insufficient to energize additional ones of the relay coils 50, 60 and 61. However, the voltage will still be sufficient to maintain the energized coil in an energized state.

A normally closed overweight switch 64 is placed in series with the AC power source 43 and the constituent feed motors 44—49. The normally closed overweight switch 64 is connected directly to the batch receiving hopper 11 to terminate the feeding of all constituents if the maximum hopper capacity should be exceeded.

What I claim is:

1. A method for the separate compounding of individual batches containing predetermined measured quantities of various constituents, each of which batches is to be delivered to a selected utilizing means, said method comprising the steps of:
   1. feeding a first constituent from a supply thereof into a batch receiving hopper until the accumulated quantity thereof at least equals a desired quantity plus any unpredictable overage resulting from variations in the feeding operation and constituent condition, said desired quantity comprising the algebraic sum of
      a. the predetermined measured quantity for said first constituent and
      b. a first constituent error quantity determined for the most recent batch delivered to the selected utilizing means;
   2. weighing the total quantity of said first constituent accumulated in said hopper including any overage;
   3. determining a new first constituent error quantity from said desired quantity and the weighed quantity of said first constituent;
   4. successively feeding additional constituents from supplies thereof into said hopper until the accumulated quantity of each of said additional constituents at least equals a desired quantity for such constituent plus any unpredictable overage resulting from variations in the feeding operation and constituent condition, said desired quantity for each of said additional constituents comprising the algebraic sum of
      a. the predetermined measured quantity for each of said additional constituents and
      b. an error quantity for each of said additional constituents and determined for the most recent batch delivered to the selected utilizing means;
   5. successively weighing the total quantities of each of said additional constituents accumulated in said hopper including any overage;
   6. successively determining a new error quantity for each of said additional constituents from said desired quantity for each of said additional constituents and the weighed quantity for the corresponding additional constituent; and
   7. delivering the compounded batch to the selected utilizing means.

2. A method for separate compounding of individual batches containing predetermined measured quantities of various constituents, as defined in claim 1, wherein the feeding of each of said first constituent and said additional constituents is at a fast rate when more than a predetermined amount remains to be fed into said hopper and at a slow rate when less than the predetermined amount remains to be fed into said hopper.

3. A method for the separate compounding of individual batches containing predetermined measured quantities of various constituents, as defined in claim 1, wherein the compounded batch is mixed prior to delivering to the selected utilizing means.

4. A method for the separate compounding of individual batches containing predetermined measured quantities of various constituents, as defined in claim 3, wherein a batch is being compounded for a selected utilizing means while a previously compounded batch for a selected utilizing means is being mixed and a previously mixed compounded batch is simultaneously being delivered to a selected utilizing means.

5. A method for the separate compounding of individual batches containing predetermined measured weights of various constituents, each of which batches is to be delivered to a selected utilizing means, said method comprising the steps of:
   1. establishing the tare weight of a batch receiving hopper;
   2. feeding a first of such constituents from a supply thereof into said hopper until the total weight of the accumulated first constituent and said hopper equals a desired weight, said desired weight comprising the algebraic sum of
      a. the tare weight of said hopper, b. the predetermined measured weight for said first constituent, c. an estimated unpredictable dribble weight for said first constituent, and d. a first constituent error weight determined for the most recent batch compounded for the selected utilizing means;

3. determining a new first constituent dribble weight and a new first constituent error weight from said desired weight and the total weight of said hopper and the first constituent accumulated therein, including any unpredictable dribble;

4. successively feeding the remainder of such constituents from supplies thereof into said hopper until for each of such constituents the total weight of said hopper and the constituents accumulated therein equals a desired weight, said desired weight for each of the remainder of such constituents comprising the algebraic sum of a. the tare weight of said hopper, b. the weight of all batch constituents previously accumulated in said hopper, c. the predetermined measured weight for the constituent being fed, d. an estimated unpredictable dribble weight determined for the constituent being fed, and e. an error weight determined for the constituent being fed for the most recent batch compounded for the selected utilizing means;

5. determining new dribble and error weights for each of the remainder of such constituents from said desired weight for each constituent and the total weight of said hopper and the constituents accumulated therein, including any unpredictable dribble, prior to feeding the next one of the remainder of such constituents; and 6. delivering the compounded batch to the selected utilizing means.

6. A method for the separate compounding of individual batches containing predetermined measured weights of various constituents, as defined in claim 5, wherein the error weight for each one of the constituents is equal to the difference between the desired weight for said one constituent and the total weight of said hopper, all constituents accumulated in said hopper prior to feeding said one constituent and the amount of said one constituent actually accumulated in said hopper.

7. A method for the separate compounding of individual batches of glass containing predetermined measured quantities of various glass constituents, each of which batches is to be delivered to a selected glass melting furnace, said method comprising the steps of:

1. feeding a first constituent from a supply thereof into a batch receiving hopper until the accumulated quantity thereof at least equals a desired quantity plus any unpredictable overage resulting from variations in the feeding operation and constituent condition, said desired quantity comprising the algebraic sum of a. the predetermined measured quantity for said first constituent and b. a first constituent error quantity determined for the most recent batch of glass delivered to the selected glass melting furnace;

2. weighing the total quantity of said first constituent accumulated in said hopper including any overage;

3. determining a new first constituent error quantity from said desired quantity and the weighed quantity of said first glass constituent;

4. successively feeding the remaining glass constituents from supplies thereof into said hopper until the accumulated quantity of each of said remaining glass constituents at least equals a desired quantity for such constituent plus any unpredictable overage resulting from variations in the feeding operation and constituent condition, said desired quantity for each of said additional constituents comprising the algebraic sum of a. the predetermined measured quantity for each of said remaining glass constituents and b. an error quantity for each of said remaining glass constituents and determined for the most recent batch of glass delivered to the selected glass melting furnace;

5. successively weighing the total quantities of each of said remaining glass constituents accumulated in said hopper including any overage;

6. successively determining a new error quantity for each of said remaining glass constituents from said desired quantity for each of said remaining glass constituents and the weighed quantity for the corresponding remaining glass constituent; and 7. delivering the compounded batch to the selected glass melting furnace.

8. A method for the separate compounding of individual batches of glass containing predetermined measured quantities of various glass constituents, as defined in claim 7, wherein the feeding of each of said first constituent and said remaining glass constituents is at a fast rate when more than a predetermined amount remains to be fed into said hopper and at a slow rate when less than the predetermined amount remains to be fed into said hopper.

9. A method for the separate compounding of individual batches containing predetermined measured weights of various constituents, each of which batches is to be delivered to a selected utilizing means, said method comprising the steps of:

1. establishing the tare weight of a batch receiving hopper;

2. successively feeding each of the constituents from supplies thereof into said hopper until for each of the constituents the total weight of said hopper and the constituents accumulated therein equals a desired weight, said desired weight for each one of the constituents comprising the algebraic sum of a. the tare weight of said hopper, b. the weight of all previously accumulated constituents in said hopper, c. the predetermined measured weight for said one constituent, d. an estimated unpredictable dribble weight determined for said one constituent, and e. an error weight determined for said one constituent for the most recent batch compounded for the selected utilizing means;

3. successively determining new dribble and error weights for each constituent from said desired weight for each constituent and the total weight of said hopper and the constituents accumulated therein, including any unpredictable dribble, prior to feeding the next one of the constituents; and 4. delivering the compounded batch to the selected utilizing means.

10. A method for the separate compounding of individual batches of glass containing predetermined measured weights of various glass constituents, each of which batches is to be delivered to a selected glass melting furnace, said method comprising the steps of:

1. establishing the tare weight of a batch receiving hopper;

2. feeding a first of such glass constituents from a supply thereof into said hopper until the total weight of the accumulated first glass constituent and said hopper equals a desired weight, said desired weight comprising the algebraic sum of a. the tare weight of said hopper, b. the predetermined measured weight for said first glass constituent, c. an estimated unpredictable dribble weight for said first glass constituent, and d. a first constituent error weight determined for the most recent batch compounded for the selected glass melting furnace;

3. determining a new first constituent dribble weight and a new first constituent error weight from said desired weight and the total weight of said hopper and the first constituent accumulated therein, including any unpredictable dribble;
4. successively feeding the remainder of such glass constituents from supplies thereof into said hopper until for each of such glass constituents the total weight of said hopper and the constituents accumulated therein equals a desired weight, said desired weight for each of the remainder of such glass constituents comprising the algebraic sum of
   a. the tare weight of said hopper,
   b. the weight of all glass constituents previously accumulated in said hopper,
   c. the predetermined measured weight for the glass constituent being fed,
   d. an estimated unpredictable dribble weight determined for the glass constituent being fed, and
   e. an error weight determined for the glass constituent being fed for the most recent batch compounded for the selected glass melting furnace;
5. determining new dribble and error weights for each of the remainder of such glass constituents from said desired weight for each constituent and the total weight of said hopper and the constituents accumulated therein, including any unpredictable dribble, prior to feeding the next one of the remainder of such glass constituents; and
6. delivering the compounded batch to the selected glass melting furnace.